United States Patent [19]

Katoh et al.

[11] Patent Number: 4,839,488
[45] Date of Patent: Jun. 13, 1989

[54] ELECTRIC DISCHARGE MACHINE USING A CERAMIC FILTER TO FILTER THE WORKING FLUID

[75] Inventors: Yoshihisa Katoh, Toyota; Takashi Ogawa; Mitsumasa Hasegawa, both of Kariya, all of Japan

[73] Assignee: Toshiba Ceramics Co., Ltd., Tokyo, Japan

[21] Appl. No.: 87,351

[22] Filed: Aug. 20, 1987

[30] Foreign Application Priority Data

Aug. 20, 1986 [JP] Japan ................... 61-194593

[51] Int. Cl.$^4$ ............................................. B23H 1/10
[52] U.S. Cl. ................................ 219/69.18; 210/510.1
[58] Field of Search ............ 219/69 D; 210/409, 411, 210/437, 510.1, 435, 489, 490, 497.01, 500.1; 55/485, 522, 523

[56] References Cited

U.S. PATENT DOCUMENTS

| | | | |
|---|---|---|---|
| 2,868,382 | 1/1959 | Best | 210/409 |
| 3,469,057 | 9/1969 | Maines | 219/69 D |
| 3,477,948 | 11/1969 | Inoue | 219/69 D |
| 3,678,240 | 7/1972 | Dietrizk | 219/69 D |
| 3,962,081 | 6/1976 | Yarwood et al. | 210/510.1 |
| 4,278,544 | 7/1981 | Takashima | 210/503 |
| 4,518,501 | 5/1985 | Lennartz et al. | 210/437 |
| 4,562,021 | 12/1985 | Alary et al. | 210/500.2 |
| 4,587,016 | 5/1986 | Sumiyoshi | 210/510.1 |
| 4,591,383 | 5/1986 | McGarry et al. | 210/510.1 |
| 4,626,332 | 12/1986 | Inoue | 219/69 D |
| 4,629,483 | 12/1986 | Stanton | 55/523 |
| 4,719,058 | 1/1988 | Komoda | 210/510.1 |
| 4,746,341 | 5/1988 | Komoda | 55/523 |

FOREIGN PATENT DOCUMENTS

| | | | |
|---|---|---|---|
| 1196873 | 11/1985 | Canada | 210/510.1 |
| 158463 | 1/1983 | German Democratic Rep. | 210/411 |
| 2154892 | 9/1985 | United Kingdom | 210/409 |

Primary Examiner—A. D. Pellinen
Assistant Examiner—Geoffrey S. Evans
Attorney, Agent, or Firm—Wegner & Bretschneider

[57] ABSTRACT

An electric discharge machine includes a clean work fluid tank for storing a clean work fluid and a work tank connected to the clean work fluid tank for receiving and storing the work fluid. An electric discharge is designed to occur through a small space between two charged electrodes, which are a workpiece and a tool, so that at each discharge a small amount of workpiece material is removed, producing particles which are suspended in the work fluid. A settling tank is connected to the work tank that receives and stores the work fluid and a filter container containing a ceramic filter is connected between the clean work fluid tank and the settling tank, so that the work fluid which is supplied from the settling tank passes through the ceramic filter and so that work fluid which has not been filtered is sent back to the settling tank.

9 Claims, 4 Drawing Sheets

ELECTRIC DISCHARGE MACHINE USING A CERAMIC FILTER TO FILTER THE WORKING FLUID

BACKGROUND OF THE INVENTION

This invention relates to an improved electric discharge machine.

An electric discharge machine has numerous applications, such as machining of materials with poor machinability, and can be used to generate almost any complicated geometry. Electric-discharge machining is based on the principle of erosion of metals by spark discharges. The discharge occurs when a potential difference between a tool and a workpiece is large enough to cause a breakdown in a dielectric fluid or work fluid such as an oil. The discharge is rapidly repeated, and each time a small amount of workpiece material is removed so as to produce particles.

The cleanliness of the work fluid has a significant effect on occuracy of the machining. If many particles removed from workpieces are suspended between a tool and a workpiece in the work fluid, the discharge easily occurs, so that rates of metal removal can not be precisely controlled.

To ensure that the work fluid is clean, the work fluid containing the removed particles has been filtered with a filter paper or a filter cloth coated with clay or diatomaceous earth.

However, in the case of an electric discharge machine equipped with such a conventional filter, the replacement of clogged up filters is often required. Thus, the workability is decreased. Also, nonuniformity of a coating formed on a filter cloth allows some removed particles to pass through the filter.

DESCRIPTION OF THE EMBODIMENT

Figure 1:
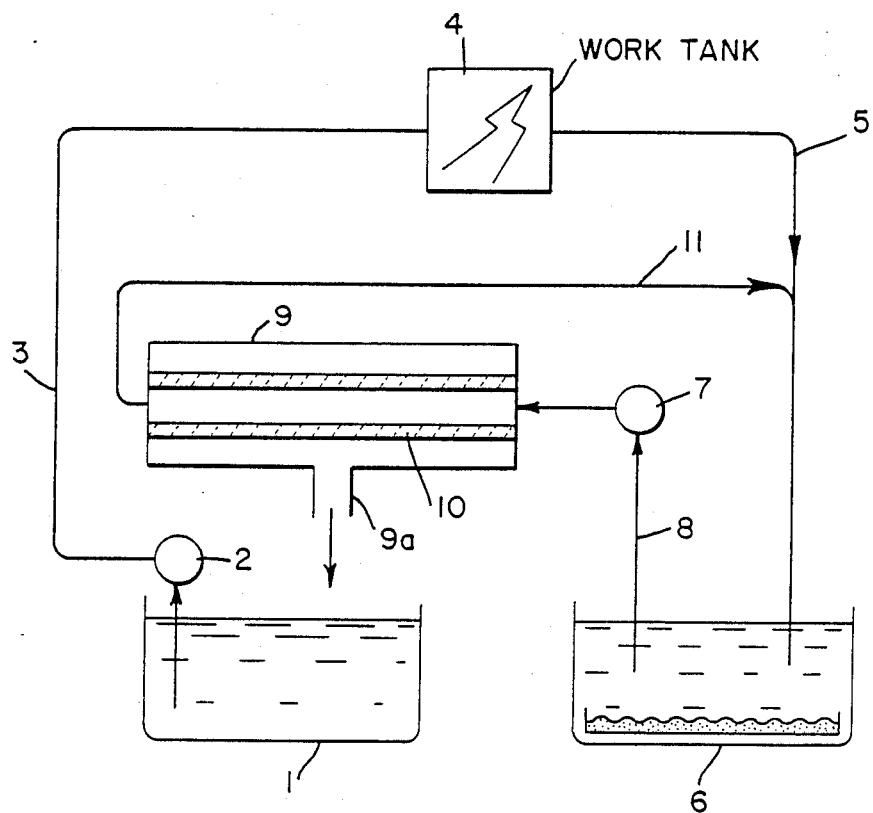
FIG. 1 is a schematic explanation view showing an electric discharge machine according to an embodiment of this invention.

Referring to FIG. 1, an electric discharge machine includes a clean work fluid tank 1 for storing clean work fluid such as oil or pure water, a work tank 4 in which a workpiece or workpieces (not shown) are set in a conventional manner, a settling tank 6 for settling particles produced by the electric discharge in the work tank 4, a pump 2, a pipe 3 for supplying the clean work fluid into the work tank 4 by means of the pump 2, and a pipe 5 connected to the settling tank 6. In the work tank 4, a transient electric discharge repeatedly occurs through a small space between two electrodes which are the workpiece and a tool immersed in the work fluid. As the particles are suspended in the work fluid, the work fluid functions to carry away the particles produced by the electric discharge. The work fluid containing the particles is sent through the pipe 5 to the settling tank 6.

A ceramic filter 10 is arranged in a filter container 9. The settling tank 6 is connected to one end of the ceramic filter 10 through a pipe 8 and a pump 7. The other end of the ceramic filter 10 is connected via a pipe 11 to the settling tank 6. When the work fluid is fed by the pump 7, it is forced to pass through the ceramic filter 10 in such a way that a pressure in the ceramic filter 10 is larger than a pressure outside of the ceramic filter 10. The filtrate or work fluid which has been filtered by the ceramic filter 10 is discharged through a port 9a of the filter container 9 into the clean work fluid tank 1. The particles are caught by the ceramic filter 10. The work fluid which has not been filtered by the ceramic filter 10 is sent back through the pipe 11 into the settling tank 6.

Figure 2:
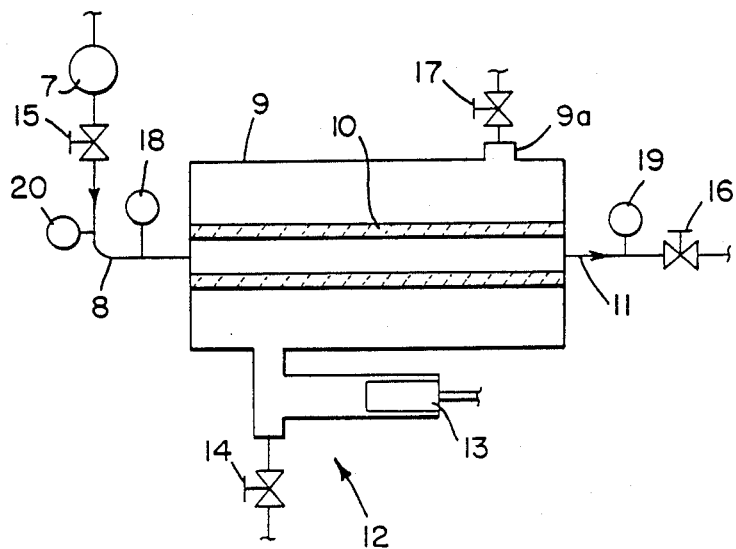
FIG. 2 is a schematic explanation view showing a modified portion of the electric discharge machine.

It is preferable that the ceramic filter 10 is backwashed in the filter container 9. For example, as shown in FIG. 2, a piston-cylinder type back washing apparatus 12 is attached to the filter container 9 so as to back wash the ceramic filter 10 with the filtrate remaining in the filter container 9. A piston 13 can be actuated by an air cylinder means (not shown). Reference numerals 14 to 17 denote valves for controlling liquid flows. Reference numerals 18 and 19 denote means for interrupting the liquid flow. The valves 14, 16 and 17 are closed when the ceramic filter 10 is back washed. Reference 20 denotes a flow meter.

Preferably, the ceramic filter 10 includes a filter layer having a thickness of 10 and 40 micron meters (hereinafter called merely microns),from a filter surface. When it is measured by a mercury porosity meter, a cumulative intrusion volume of all pores in the filter layer is 0.2 cc/g or less. The cumulative intrusion volume of the pores having pore diameters of 0.1 to 3.0 microns is 0.1 cc/g or more. The cumulative intrusion volume (H) of the pores ranging within the pore diameter width (w) of 0.1 microns around a center pore diameter (PD), which is the pore diameter for a half of a cumulative intrusion volume (IV) at the pore diameter of 0.1 microns, is 50% or more of the cumulative intrusion volume of all pores.

If the thickness of the filter layer is less than 10 microns, high strength can not be obtained, and nonuniformity can not be avoided. If it is more than 40 microns, the filtration performance is decreased, and the filter layer is sometimes broken away due to heat expansion.

If the cumulative intrusion volume of all pores is more than 0.2 cc/g, a desired strength can not be easily obtained. If the cumulative intrusion volume of the pores having a pore diameter of 0.1 to 3.0 microns is less than 0.1 cc/g, the filtration rate is decreased.

Figure 3:
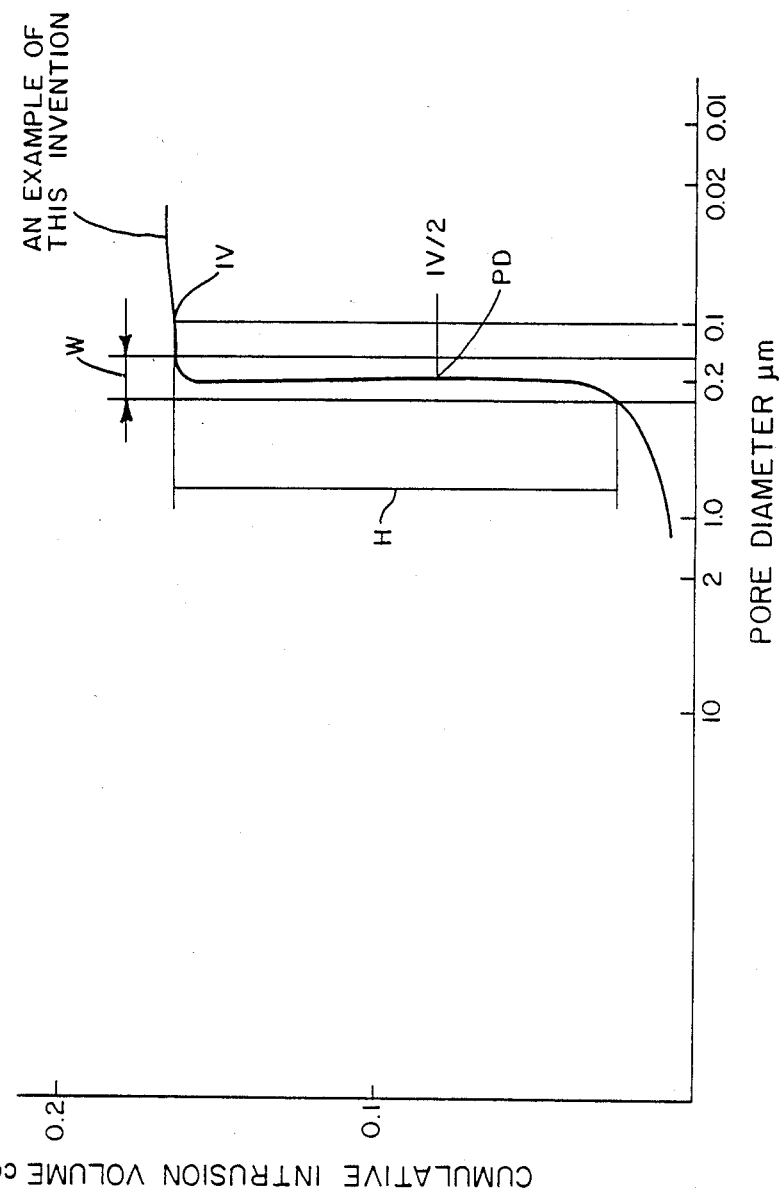
FIG. 3 is a graph showing a relationship between pore diameter and cumulative intrusion volume of a ceramic filter for use in the electric discharge machine.

Referring to FIG. 3 showing an example of the ceramic filter (10), the cumulative intrusion volume of all pores is 0.18 cc/g. The cumulative intrusion volume of the pores having a pore diameter of 0.1 to 3.0 microns is 0.17 cc/g. The center pore diameter (PD) is 0.2 microns. The cumulative intrusion volume (H) of the pores ranging within a pore diameter width (W) of 0.1 microns is 0.12 cc/g, the percentage of which is 66.7%. This cumulative intrusion volume (H) is larger than a half of the cumulative intrusion volume (IV) at a pore diameter of 0.1 microns.

The filter layer preferably consists of plural layers, for example, such as an intermediate layer coated on the inner surface of a support layer and an inner layer coated on the intermediate layer. The intermediate layer is made of alumina powders having a article size of 2 to 10 microns, and the inner layer is made of alumina powders having a particle size of 0.4 to 1 microns.

Figure 4:
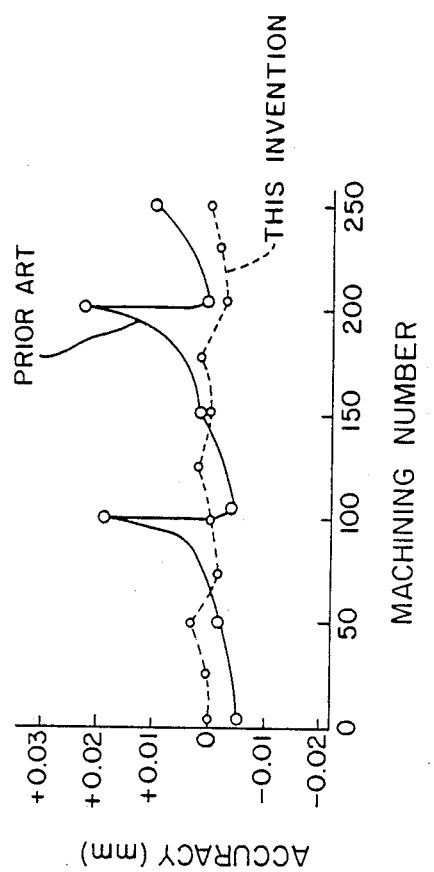
FIG. 4 is a graph showing a relationship between machining number and accuracy of a ceramic filter according to this invention in comparison with a prior art filter.

FIG. 4 shows relationships between the number of electric discharge machining and the accuracies of machining with respect to a ceramic filter of this invention and a conventional filter including a filter cloth coated with clay. The filters are set in the electric discharge machine of FIG. 1. The tool is a wire. The workpieces are for automobile parts having an accuracy of ±0.01 mm in size. When the ceramic filter 10 of this invention is used, the flow rate of the work fluid is 2.5 m/sec and the pressure difference is 1 kg. In case of the conventional filter, a filter is replaced whenever about 100 parts are machined. When 10,000 parts are machined, the number of inaccurate parts is from 100 to 120 according to the conventional filter while that is only from 3 to 10 according to this invention.

This application incorporates by reference the disclosure of co-pending U.S. application Ser. No. 087,290, filed Aug. 20, 1987, which disclosed construction details of a filter unit using the ceramic filter of this invention, and co-pending U.S. application Ser. No. 087,352, filed Aug. 20, 1987, which is directed to the ceramic filter used in this invention. This application also incorporates by reference the disclosure of co-pending U.S. application Ser. No. 087,357, filed Aug. 20, 1987, which discloses a further specific use for the ceramic filter used in this invention to purify a reaction mixture used in the manufacture of esters.

According to this invention, the workability can be improved. The number of used filters to be discharged is decreased because each ceramic filter has a long life time. A lot of accurate parts can be machined at a high efficiency.

We claim:

1. An electric discharge machine, comprising:
 a clean work fluid tank for storing a clean work fluid;
 a work tank connected to the clean work fluid tank for receiving and storing the work fluid in which an electric discharge is designed to occur through a small space between two charge electrodes which are a workpiece and a tool so that at each discharge a small amount of workpiece material is removed, producing particles which are suspended in the work fluid;
 a settling tank connected to the work tank for receiving and storing the work fluid containing the particles in such a way that the particles can settle;
 a filter container connected to the clean work fluid tank and the setting tank; and
 a ceramic filter set in the filter container in such a manner that the work fluid containing the particles is supplied from the settling tank and passes through the ceramic filter, and after that the work fluid which has not been filtered by the ceramic filter is sent back to the settling tank,
 wherein the ceramic filter comprises a support layer having an inner surface for forming at least one filter passage and a filter layer on the inner surface of the support layer and having an inner surface functioning as a filter surface, the filter layer having a thickness of 10 to 40 microns from the filter surface,
 wherein all pores in the filter layer have a cumulative intrusion volume of 0.2 cc/g or less, pores having pore diameters of 0.1 to 3.0 microns have a cumulative intrusion volume of 0.1 cc/g or more, and pores ranging within a pore diameter width (W) of 0.1 microns around a center pore diameter (PD) have a cumulative intrusion volume (IV) which is 50% or more of the cumulative intrusion volume of all pores in the filter layer.

2. The electric discharge machine of claim 1, wherein the filter container has a port connected to the clean work fluid tank so that filtrate can be sent to the clean work fluid tank.

3. The electric discharge machine of claim 1, wherein a back washing device is attached to the filter container for back washing the ceramic filter by means of the filtrate remaining in the filter container.

4. The electric discharge machine of claim 3, wherein the back washing device includes a cylinder means and a piston movably set in the cylinder means.

5. The electric discharge machine of claim 1, wherein the ceramic filter is formed in the shape of a pipe.

6. The electric discharge machine of claim 1 wherein the filter layer is made of an alumina ceramic material having a high purity.

7. The electric discharge machine of claim 1, wherein the filter is formed in the shape of a pipe.

8. The electric discharge machine of claim 1, wherein the filter layer includes an intermediate layer coated on the inner surface of the support layer and an inner layer coated on the intermediate layer.

9. The electric discharge machine of claim 8, wherein the intermediate layer is made of alumina powders having a particle size of 2 to 10 microns, and the inner layer is made of alumina powders having a particle size of 0.4 to 1 microns.

* * * * *